United States Patent [19]

Gerdes et al.

[11] Patent Number: 5,382,010

[45] Date of Patent: Jan. 17, 1995

[54] FURNITURE ARTICLE AND FIXTURE FOR MAKING SAME

[75] Inventors: Raymond J. Gerdes, Greenville; Dennis L. Dufon, Spring Lake, both of Mich.

[73] Assignee: Metalarc Inc., Muskegon, Mich.

[21] Appl. No.: 32,793

[22] Filed: Mar. 17, 1993

[51] Int. Cl.$^6$ .............................................. B25B 1/20
[52] U.S. Cl. ...................................... 269/41; 269/111; 29/281.3; 29/281.5
[58] Field of Search .......................... 269/41, 111-118, 269/47, 49, 52, 910; 33/535, 474, 482, 562, 613, 404, 403; 52/698, 657; 29/281.3, 281.5

[56] References Cited

U.S. PATENT DOCUMENTS

| | | | |
|---|---|---|---|
| 2,606,583 | 8/1952 | O'Connor | 269/41 |
| 3,066,962 | 12/1962 | Koehler | 269/111 |
| 3,392,972 | 7/1968 | Wing | 269/111 |
| 4,305,575 | 12/1981 | Bardes | 269/41 |
| 4,673,174 | 6/1987 | Tabbert | 269/41 |
| 4,805,315 | 2/1989 | Nesbitt | 269/41 |

FOREIGN PATENT DOCUMENTS 3430808  3/1986  Germany ................... 269/41

Primary Examiner—Robert C. Watson
Attorney, Agent, or Firm—Price, Heneveld, Cooper, DeWitt & Litton

[57] ABSTRACT

An article of furniture is provided having an improved corner joint. The furniture includes a pair of spaced apart end pieces, each end piece including corners with pockets formed in the corners by bent flanges. The pockets have a square cross-sectional shape and the flanges form all four sides of the pockets. A pair of tubes are shaped for close engagement in the pockets. A pair of fixtures and hand clamps are provided, the fixtures including plates adapted to engage the openings formed by the tubes. Clamps on the plates are actuatable to hold the end pieces and the tubes to the perimeter of the plates in a predetermined shape and the hand clamp improve surface flushness of the corner joint during welding. By this arrangement, the furniture components are clamped together in a highly dimensionally accurate arrangement which is both square and repeatable.

14 Claims, 5 Drawing Sheets

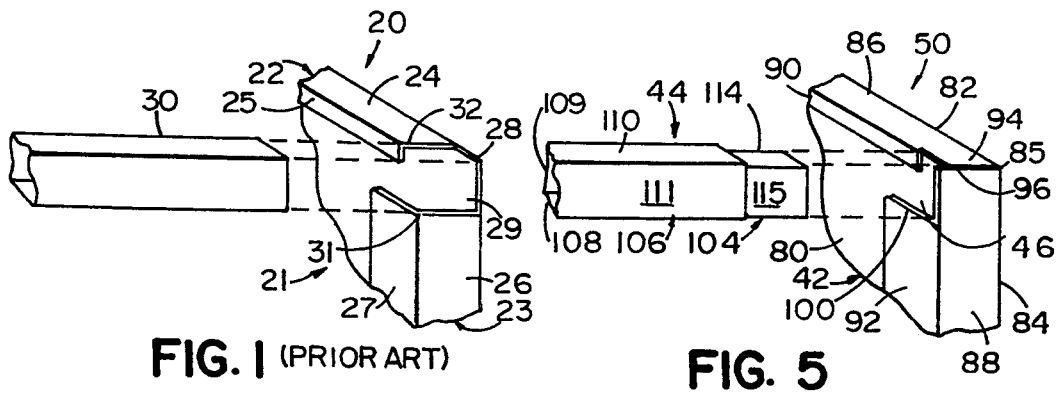
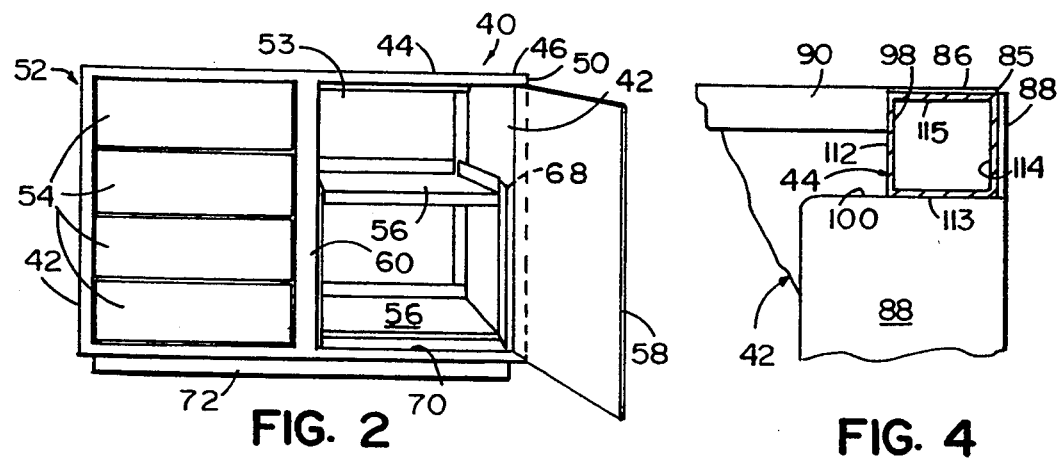
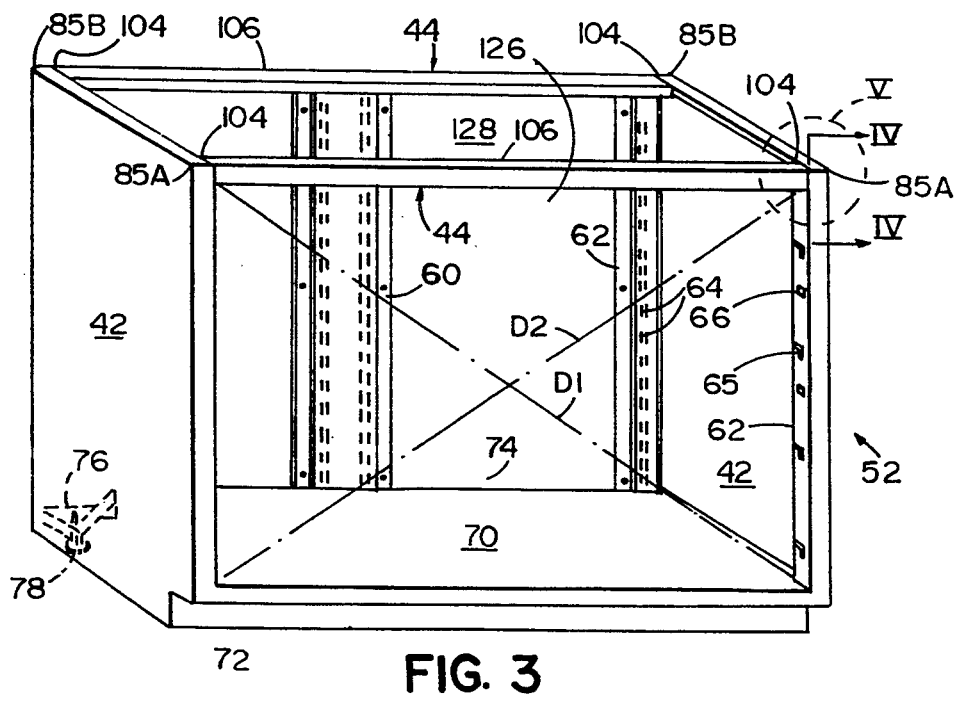

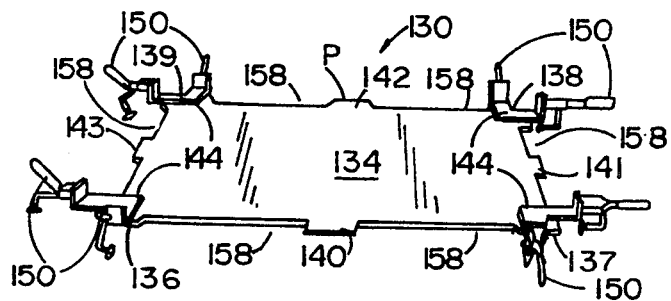
FIG. 12
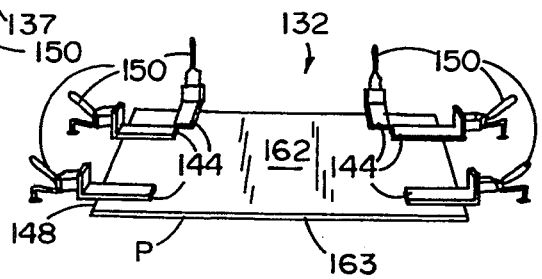
FIG. 13
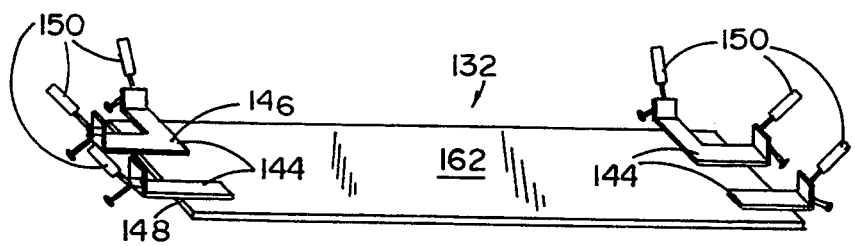
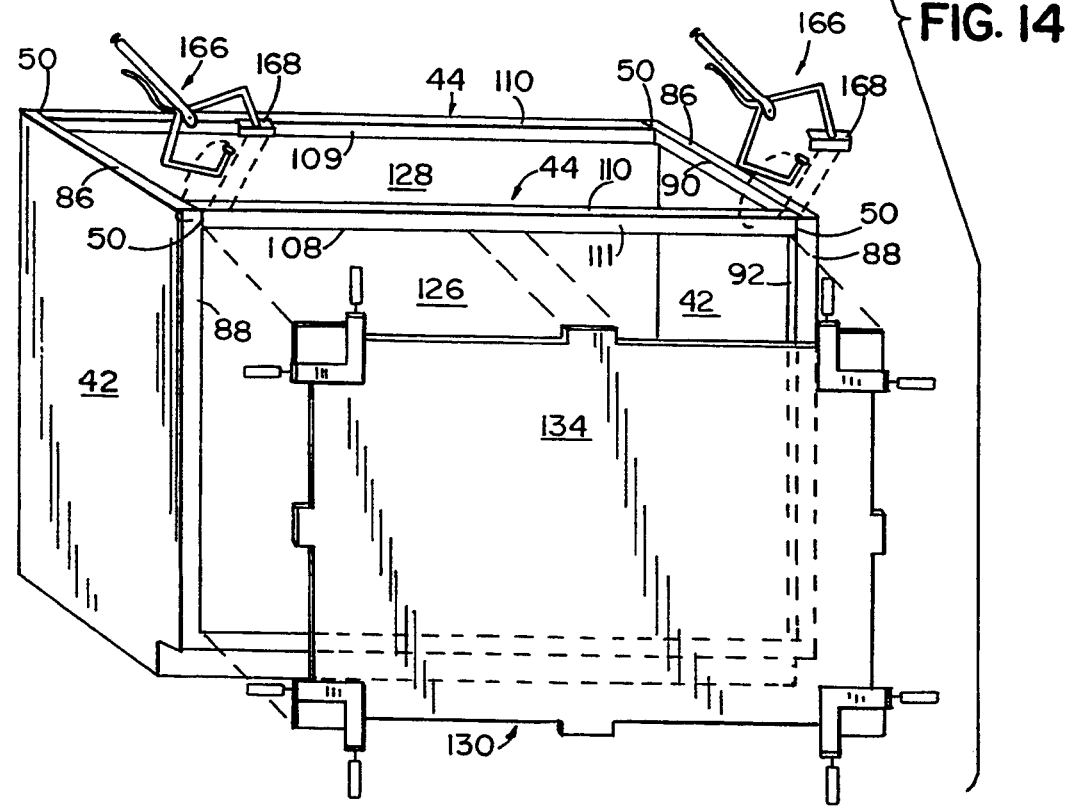
FIG. 14

FURNITURE ARTICLE AND FIXTURE FOR MAKING SAME

BACKGROUND OF THE INVENTION

The present invention relates generally to furniture, and in particular to a furniture article with improved strength and dimensional accuracy. The present invention also relates to fixturing which provides the improved dimensional accuracy.

The furniture industry has become increasingly competitive, particularly with furniture articles such as laboratory cabinets and the like. In order to remain competitive, the furniture articles are being designed with thinner and lighter materials. However, cabinets with large access openings have poor diagonal strength due to the lack of structure across the access openings. This places tremendous stress at the corners of the cabinets, which can be particularly problematic where thinner and lighter materials are being used. Further, to conserve materials, the outer surfaces of the structural members are also being used to provide the show surface. Thus, it is important that any joints at the corners be both strong and also aesthetically acceptable without substantial rework.

Another problem with cabinets and the like is that historically they have lacked dimensional consistency. It is not uncommon for the diagonal dimensions of cabinets to be up to one quarter of an inch different from each other. This can create uneven and unsightly gaps. These problems are compounded by the modularity now being demanded in the furniture industry, which modularity is being provided so that shelves, drawers, and other specialty items can be readily added, removed, or changed.

Thus, an improved furniture article and fixture solving the aforementioned problems is desired.

SUMMARY OF THE INVENTION

The present invention includes an article of furniture having a structural component with a corner defined by a first panel section with first and second orthogonal edges. First and second flanges extend from the first and second orthogonal edges, respectively, and third and fourth flanges extend from the first and second flanges, respectively. The first and second flanges extend perpendicularly to each other and to the first panel section and also to the third and fourth flanges. The third and fourth flanges extend parallel to the first panel section. The first and second flanges include ends contacting one another. The third and fourth edges also include ends, the third flange end being spaced from the second flange and the fourth flange end being spaced from the first flange so that the third and fourth flange ends define a pocket with the first and second flanges. A tube is provided including a tube end section and a tube intermediate section connected to the tube end section. The tube end section has a cross-sectional shape adapted to mateably engage the pocket. The tube intermediate section includes first and second planar wall sections that align with the first and second flanges, respectively, when the tube end section is positioned in the pocket. The tube end section can be placed in the pocket and the tube can be joined to the structural component with a desired level of structural rigidity, strength, and dimensional consistency. Notably, the joint formed by the pocket and tube requires only minimal rework to provide an aesthetically acceptable appearance. In a narrower aspect, a pair of tubes are used and a pair of spaced apart end pieces are provided, each end piece having a pair of pockets for receiving a tube end section.

In another aspect, a fixturing arrangement is provided for squaring a furniture article during manufacture, such as the above described article, and for assuring dimensional integrity and improved squareness after assembly of same. In the unassembled state, the furniture article includes a plurality of members loosely arranged in a picture frame shape and adapted to be secured together to form an opening. The fixture includes a plate for resting within the opening defined in the furniture, the plate including a perimeter of predetermined shape with orthogonal edges and corners. A plurality of clamps are secured to the plate proximate at least three of the orthogonal edges. The clamps each include a clamping foot and are actuatable so that the clamping foot engages one of the plurality of members to securely retain the one member against a selected one of the orthogonal edges of the plate during attachment of the plurality of members together. Thus, the plurality of members are held in the predetermined shape of the perimeter when the clamps are actuated. In a narrower aspect, two fixtures are used to square orthogonally oriented openings in the furniture.

The present invention offers several advantages over known art. The illustrated embodiment provides a joint having increased strength over known joints. Further, the joint is more durable and not prone to stress-crack over time as with at least one known joint, which known joint is disclosed in FIG. 1 of this application and labelled as prior art. Still further, the joint of the preferred embodiment is readily formable, and facilitates assembly. Regarding the fixturing, the preferred embodiment of the fixturing cooperates with the preferred embodiment of the furniture arrangement to allow manufacture of a furniture unit having much improved dimensional consistency and squareness.

These and other features, advantages and objects of the present invention will be further understood and/appreciated by those skilled in the art by reference to the following specification, claims and appended drawings.

BRIEF DESCRIPTION OF THE DRAWINGS

FIG. 1 is an exploded perspective view of a prior art joint for furniture;

FIG. 2 is a front perspective view of a cabinet embodying the present invention, the door of the cabinet being shown in the open position;

FIG. 3 is a front perspective view of the cabinet shown in FIG. 2 but with the drawers, door, and shelf removed and further with the upper cross support tubes not yet welded in place;

FIG. 4 is a cross-sectional view taken along the plane IV—IV in FIG. 3;

FIG. 5 is an exploded perspective view of the circled area V in FIG. 3;

FIG. 12 is a perspective view of a first fixture embodying the present invention;

FIG. 13 is a perspective view of a second fixture embodying the present invention;

FIG. 14 is an exploded perspective view of the first and second fixtures and also a pair of manually lockable hand clamps as used during assembly of the furniture article shown in FIG. 2;

DESCRIPTION OF PRIOR ART

Figure 6:
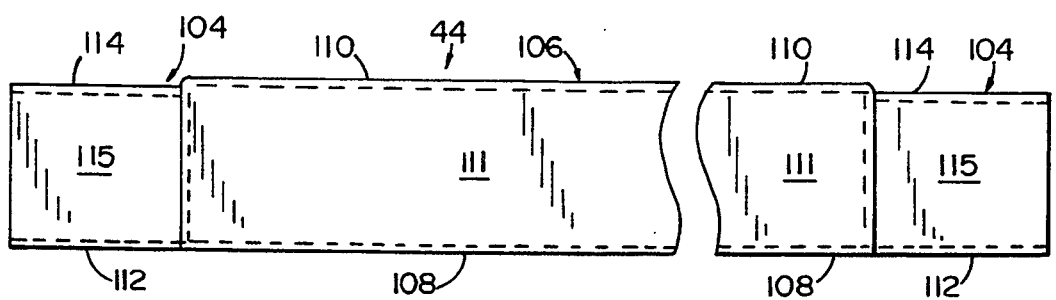
FIG. 6 is a front view of the tube shown in FIG. 2.
Figure 7:
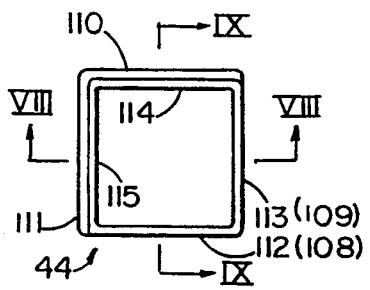
FIG. 7 is an end view of the tube shown in FIG. 6.
Figure 8:
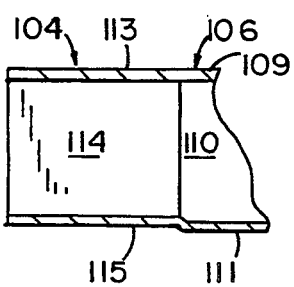
FIGS. 8 and 9 are cross-sectional views taken along the planes VIII—VIII and IX—IX, respectively, in FIG. 7.
Figure 9:
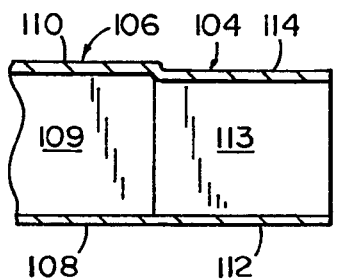

A known joint 20 of prior art is shown in FIG. 1. Joint 20 includes a side piece 21 made of sheet metal with bent L-shaped flanges 22 and 23. Flange 22 includes a first leg 24 and a second leg 25, and flange 23 includes a first leg 26 and a second leg 27. Legs 24–27 all include ends that terminate short of corner 28, thus forming a pocket 29 for receiving the end of a square tube 30. The joinder of tube 30 to pocket 29 is accomplished by placing tube 30 in pocket 29 and welding same in place. However, the joint 20 thus formed is not as strong as desired, and might be subject to stress fracture and fatigue failure at the locations 31 and 32 at the end of where legs 24–25 intersect and where legs 26–27 intersect. Further, considerable reworking to provide an acceptable appearance is sometimes required.

DETAILED DESCRIPTION OF THE PREFERRED EMBODIMENT

An article of furniture embodying the present invention is shown in FIG. 2 and is generally referred to by number 40. Furniture article 40 can be any of a number of different arrangements that utilize a sheet metal side piece or component 42 with formed edges, and one or more structural cross support tubes 44 for engaging pockets 46 formed in the corner of the pieces 42. The location at which tube 44 engages the pocket 46 in the end piece 42 forms a joint 50 that is particularly strong and durable. Further, in the preferred embodiment shown, the components of article 40 are relatively easily and accurately formed. Still further, joint 50 is readily finishable, and lends itself to improved appearance with less rework of the final product.

Furniture article 40 (FIG. 2) is shown as a laboratory cabinet with an outer shell or frame 52 (FIG. 3) finished and painted for appearance. In the particular arrangement shown (FIG. 2), four drawers 54 are mounted on the left, and a pair of slideably extendable shelves 56 are mounted on the right including a door 58 for covering the shelves. A vertical center support post 60 reinforces the center of frame 52 and divides the cabinet in half. Frame 52 defines a box-shaped internal compartment 53.

In the preferred form, corner reinforcement brackets 62 are provided (FIG. 3). Brackets 62 and also center support post 60 include various means for receiving modular units in cabinet 40, such as slots 64, notches 65 and holes 66. Slots 64 are adapted to receive one end of a glide assembly 68 (see glide assembly 268 in FIG. 20) for supporting the drawers 54 and extendable shelves 56 (FIG. 2), and further allow a wide range of rearrangement and quick replacement of components. Further, notches 65 and holes 66 are convenient for supporting various stationary shelves, doors, latches and other features.

Furniture article 40 can include various floor engaging arrangements. The floor engaging arrangement shown in FIG. 3 includes a cabinet floor panel 70, a front lower overhang support bracket 72, a rear panel 74, and four corner brackets 76 each with a vertically adjustable leveler 78 placed therein. (Only one of the corner brackets 76 and levelers 78 are shown.) Items 70, 72, 74 and 76 are interconnected such as by welding.

In one aspect, the invention is focused in joint 50 (FIG. 5). Side piece 42 includes a planar panel section 80 with first and second orthogonal edges 82 and 84 that form a corner 85. A pair of legs or outer flanges 86 and 88 extend from orthogonal edges 82 and 84 respectively, and a pair of additional legs or inner flanges 90 and 92 extend from flanges 86 and 88, respectively. Flanges 86 and 90 form an L-shaped arrangement along the top of cabinet 40, with flange 86 extending perpendicular to panel section 80 and flange 90 extending parallel to panel section 80. Flanges 88 and 92 form an L-shaped arrangement along the front of cabinet 40, with flange 88 extending perpendicular to panel section 80 and flange 86, and flange 92 extending parallel to panel section 80. Outer flanges 86 and 88 include ends 94 and 96 respectively that contact each other and form a line of contact that extends through corner 85. Inner flanges 90 and 92 include ends 98 and 100, respectively. Inner flange ends 98 and 100 are spaced from flanges 88 and 86, respectively, and define the square-shaped pocket 46 with outer flanges 86 and 88 at corner 85.

Tubes 44 (FIGS. 5–9) each include a pair of formed tube end sections 104, and a tube intermediate section 106 connected to tube end sections 104. The cross-sectional shape of tube intermediate section 106 is square, and is formed by orthogonal planar wall sections 108, 109, 110 and 111. Tube end section 104 includes corresponding orthogonal planar wall section 112, 113, 114 and 115. Inwardly facing wall sections 112 and 113 are co-planar with inwardly facing wall sections 108 and 109, respectively, but outwardly facing wall sections 114 and 115 are deformed inwardly so that they are parallel but not co-planar with outwardly facing wall sections 110 and 111. In particular, outwardly facing wall sections 114 and 115 are spaced inwardly sufficiently so that when tube end section 104 is positioned in pocket 46 with outwardly facing wall sections 114 and 115 resting on the inside of flanges 86 and 88, the outer surfaces of flanges 86 and 88 align with the outer surfaces of wall sections 110 and 111. Restated, when tube end section 104 is placed in pocket 46 to form joint 50, the outer surfaces of tube intermediate wall sections 110 and 111 are co-planar with the outer surfaces of flanges 86 and 88, respectively.

Figure 11:
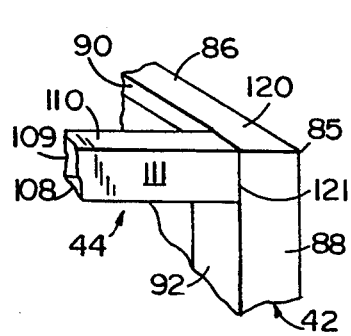
FIG. 11 is a perspective view of the joint shown in FIG. 10 after welding and grinding with the show surface at the line of joinder being represented by dashed lines.
Figure 10:
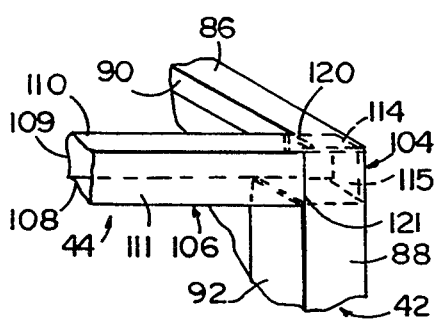
FIG. 10 is a perspective view of the joint shown in FIG. 5 after assembly but before welding.
Figure 16:
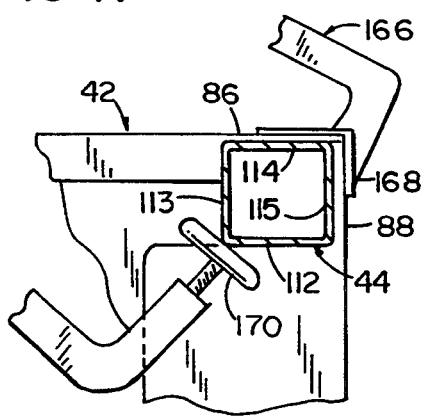
FIG. 16 is an enlarged view showing the ends of a hand clamp lockingly clamped on a joint in a manner that improves the flushness of the outer surfaces of the joint.
Figure 15:
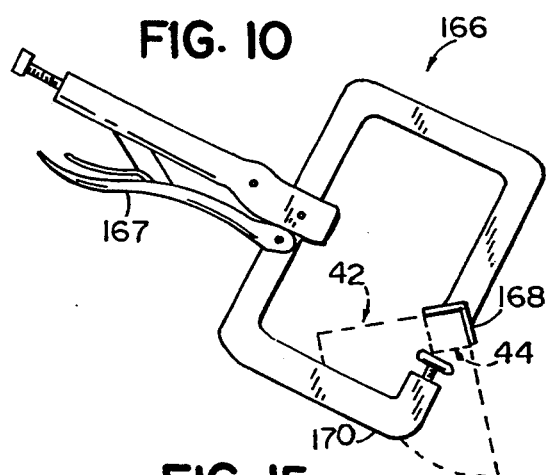
FIG. 15 is a side view of the manually lockable hand clamp shown in FIG. 14.
Figure 17:
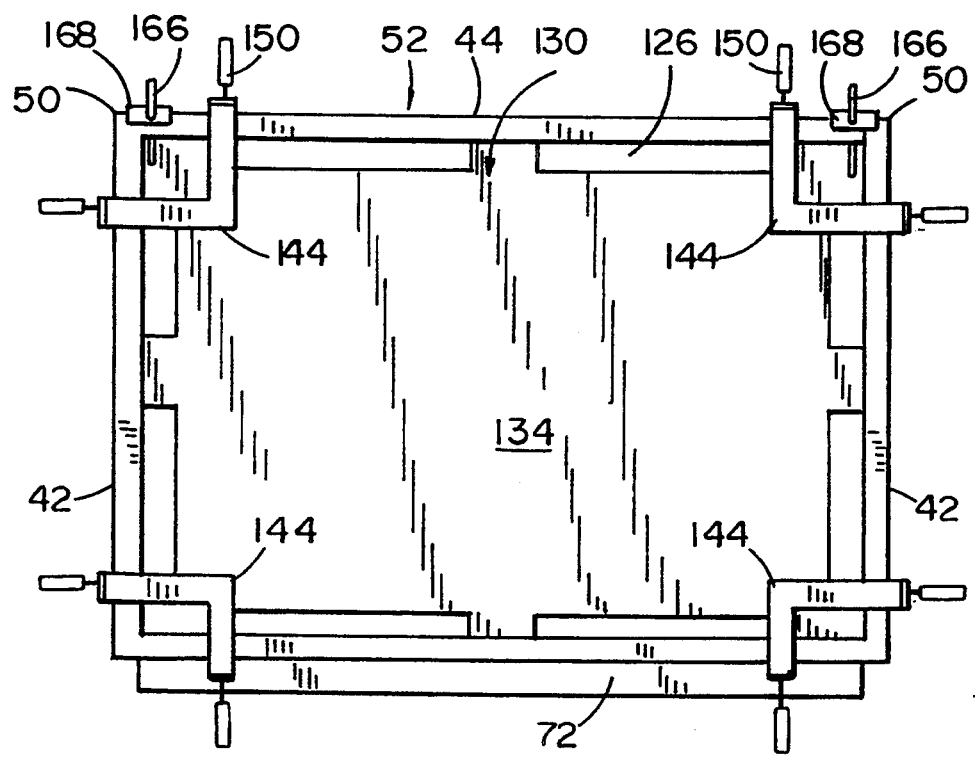
FIG. 17 is a front view of the first fixture positioned in the front opening in the furniture article.
Figure 18:
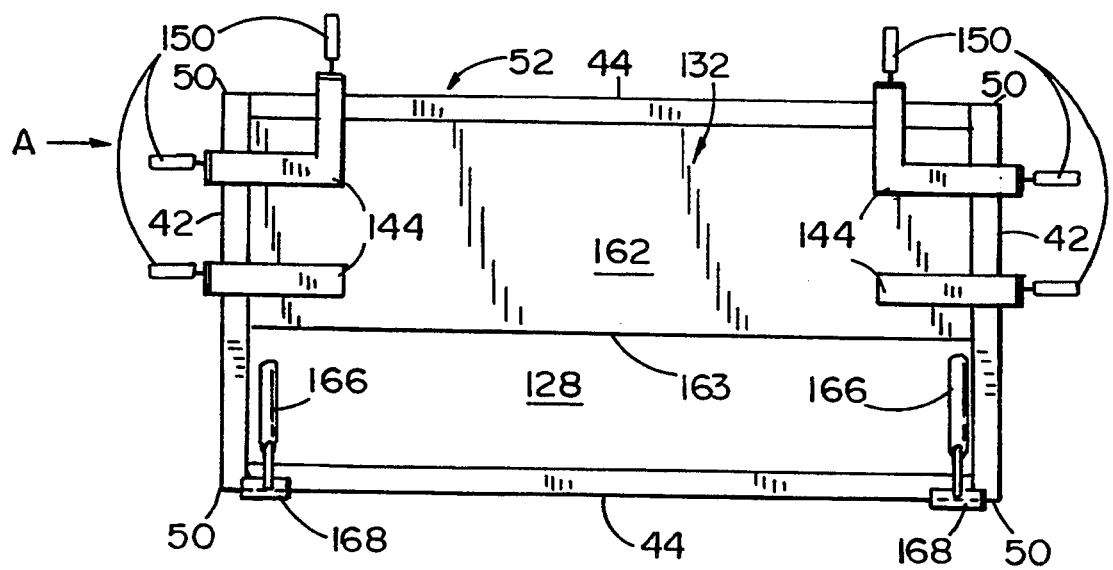
FIG. 18 is a top view of the second fixture positioned in the top opening in the furniture article.

Tube 44 is welded into place in pocket 46 such as by TIG welding or the like. Optimally, the visible recesses formed at the joint lines 120 and 121 (FIGS. 10 and 11) between tube 44 and flanges 86 and 88 are filled with weld material so that it can be later ground flush with the outer surfaces of flanges 86, 88 and intermediate wall sections 110 and 111. Thereafter, the joint lines at recesses 120 and 121 can be fully hidden such as by painting. Also, the extreme end of tube 44 is welded to end piece panel section 80 for increased stability. By forming an interconnecting joint 50 in the manner noted, tubes 44 can be made of 18 gauge sheet metal. Previously known brackets formed from a sheet of metal for use in this application were typically made of 14 gauge materials in order to achieve the stiffness and strength desired for the cabinetry described herein.

In cabinet 40 (FIG. 3), pockets 46 are formed at the upper rear and upper front corners 85A-85B of both side panels 42. Front and rear tubes 44 are positioned crosswise with tube end sections 104 being located in pockets 85A-85B. This arrangement forms a front opening 126 below front tube 44, and also forms a top opening 128 between front and rear tubes 44.

Along with the increased strength provided by joints 50, it is desirable to also improve dimensional strength and diagonal accuracy, especially across openings 126 and 128 at dimensions D1 and D2 (FIG. 3). Fixtures 130 and 132 (FIGS. 12-14) are provided for this purpose. Fixture 130 (FIG. 12) includes a planar generally rectangular plate 134 defining a rectangular perimeter "P" that is the desired shape of front opening 126. In particular, plate 134 includes corner sections 136, 137, 138 and 139 and protruding intermediate sections 140, 141, 142 and 143, each including outer edges defining perimeter P. These outer edges are adapted to engage the inner wall sections 108 on tubes 44 and the inner flanges 90 and 92 on side pieces 42. A mounting bracket 144 is secured to each orthogonal edge of corner sections 136, 137, 138 and 139, each mounting bracket 144 including a flat portion 146 extending outwardly proximate plate 134 so that a corner 148 is defined around perimeter "P". (See FIG. 19.)

Figure 19:
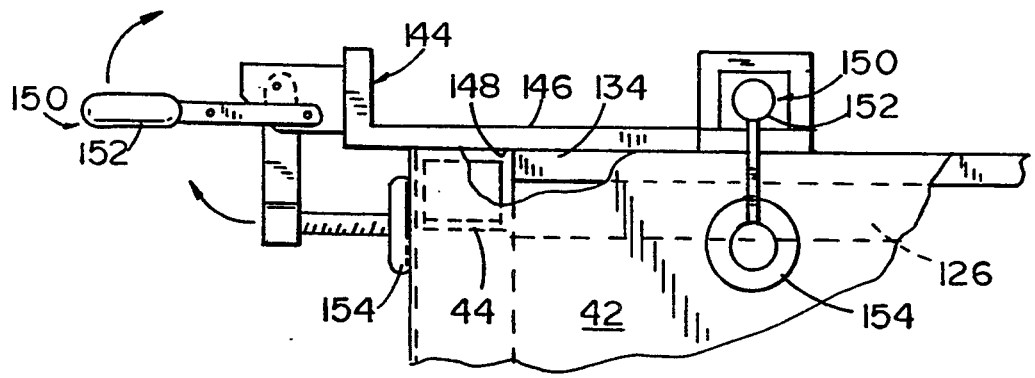
FIG. 19 is a rear view taken in the direction A in FIG. 18 with the hand clamps in the locked position.
Figure 19A:
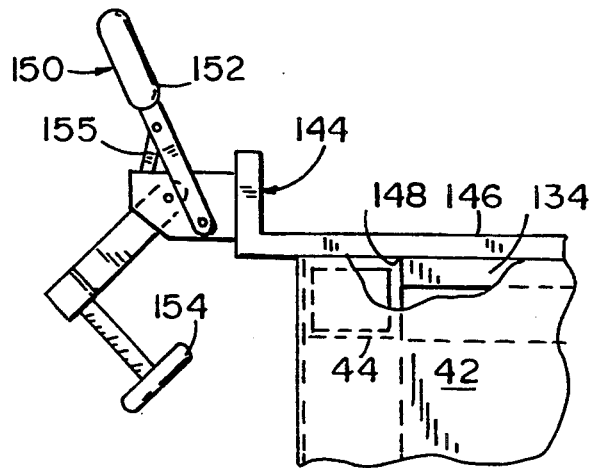
FIG. 19A is a rear view comparable to FIG. 19 but with the hand clamp in the partially open position.

A manually operable toggle clamp 150 is secured to each mounting bracket 144. Toggle clamp 150 includes a handle 152 and a clamping foot 154 (FIG. 19) interconnected by a mechanical linkage 155 (FIG. 19A). Toggle clamps such as toggle clamps 150 are generally well known in the art of fixturing. Handle 152 is interconnected to clamping foot 154 so that as handle 152 is moved, clamping foot 154 moves to a release position (FIG. 19A) for assembling fixture 130 into opening 126. Also, as handle 152 is moved downwardly, clamping foot 154 swings into the plane defined by plate 134 and forces the respective members 44 and side pieces 42 to a square and aligned position with respect to each other. Mechanical linkage 155 mechanically locks clamping foot 154 in place when handle 152 is fully pulled to a down position (FIG. 19).

By assuring that tubes 44 are fully seated in fixture perimeter corners 148, the opening 126 in cabinet 40 is thus fixtured to a very accurate dimension. Notably, joints 50 permit some telescoping movement in and out of pockets 46 so as to permit cabinet 40 to become square as fixture toggle clamps 150 are actuated. Notches 158 along the perimeter of plate 134 (FIG. 12) reduce the weight of fixture 130, and also reduce the tendency to entrap foreign material between tubes 44 (and side pieces 42) and the fixture 130, which foreign material would reduce the dimensional accuracy when using fixture 130. Notably, additional clamps can be added along perimeter P, such as on any of protruding intermediate sections 140, 141, 142 and 143, as desired.

The second top fixture 132 (FIG. 13) is comparable to fixture 130, but the hand clamps 150 are located along only three sides thereof. Specifically, fixture 132 includes a rectangular planar plate 162 adapted to fit tightly in the opening 128 between side pieces 42 and against the rearmost of tubes 44. Plate 162 extends only about two thirds of the way from the rear tube 44 toward front tube 44 as installed, and includes a side 163 without clamps. When fixture 132 is used with fixture 130, the width dimension of the furniture arrangement 40 between side pieces 42 is set at the front by front fixture 130. Thus, fixture 132 need not fully fill top opening 128. Also, by leaving open part of top opening 128, hand clamps 166 can be used to assure the flushness of the outer surfaces of tube wall sections 110 and 111 with the outer surfaces of flanges 86 and 88, respectively, as described below. Notably, plate 162 is rectangular and does not include cutouts along perimeter P. Cutouts can be added if desired.

Hand clamps 166 are manually lockable vice-lock-type hand clamps with hand grips 167 that include a locking mechanism. The basic locking mechanism of the hand clamps with hand grips 167 are commonly known and readily obtainable in the industry. However, in the illustrated fixturing example, hand clamps 166 have been modified so that one jaw includes an elongated L-shaped channel 168 and the other jaw includes an opposing plunger/clamping foot 170. L-shaped channel 168 is adapted to simultaneously support side piece flanges 86 and 88 and tube outer surfaces of wall sections 110 and 111 in a flush condition. Plunger/clamping foot 170 is adapted with a blunt end 171 that can be pressed against tube 44. Hence, tube 44 is pressed against side piece 42 and also against L-shaped channel 168 so that the outer surfaces of tube 44 and side piece 42 are flush during welding of the joint.

By using fixtures 130, 132 and hand clamps 166, the dimensional accuracy and diagonal squareness of furniture article 40 has improved the cross-diagonal squareness of openings 126 and 128 so that it is accurate to within about 1/32 of an inch. In prior known art, the range of cross-diagonal squareness of front openings was only about ¼ of an inch. Further, the strength, integrity and appearance of cabinet 40 is improved due to joints 50.

Figure 20:
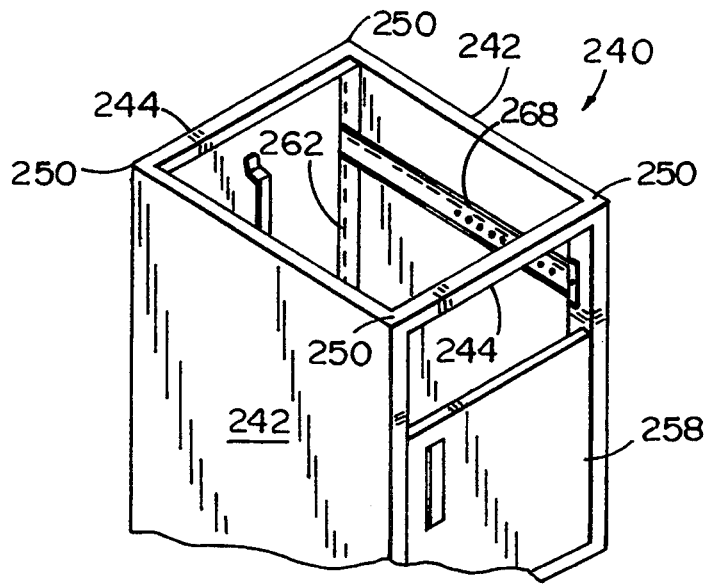
FIG. 20 is a modified cabinet embodying the present invention.

A modified cabinet 240 (FIG. 20) is shown which is comparable to cabinet 40 but which is narrower in width. In FIG. 20, the features of cabinet 240 that are comparable to furniture arrangement 40 are shown with the same numbers, but with the number 200 added thereto. For example, cabinet 240 has a door 258 and a drawer above door 258. The drawer has been removed to expose drawer glide assembly 268. As can be seen, drawer glide assembly 268 attaches to slots 264 in the rear end by screws 269 in the front. Drawer glide assembly 268 can thus be readily lowered, raised, removed, or more drawers can be added. Alternatively, shelves and other specific features can be easily added, removed or relocated as desired.

Thus, a furniture article includes side pieces with corner pockets formed by flanges, and tubes adapted to engage the pockets to form joints, which joints are readily formed, strong, and aesthetically acceptable without major rework. Further, an arrangement of fixtures is provided which improves the dimensional accuracy of the cabinet and access openings formed in the cabinets and furniture articles, which dimensional accuracy is improved to within about 1/32 of an inch.

In the foregoing description, it will be readily appreciated by those skilled in the art that modifications may be made to the invention without departing from the concepts disclosed herein. Such modifications are to be considered as included in the following claims, and the reasonable equivalents thereto, unless these claims by their language expressly state otherwise.

The embodiments of the invention in which an exclusive property or privilege is claimed are defined as follows:

1. A fixturing system for furniture for improving dimensional integrity and squareness during assembly of the furniture, the furniture including a plurality of members loosely arranged in a picture frame shape to be secured together to form an opening, comprising:

a fixture including a plate for resting within the opening defined in the furniture, the plate including a perimeter of predetermined shape with three orthogonal edges and two corners configured to stably engage the plurality of members in a manner accurately defining the width and squareness of the opening; and a plurality of clamps secured to said plate proximate said three orthogonal edges, at least one of said clamps being located along each of said three orthogonal edges, said clamps each including a clamping foot and being actuatable so that said clamping foot engages a selected one of said plurality of members and holds same against a corresponding selected one of the three orthogonal edges of said plate during fixturing of the plurality of members together, whereby said plurality of members are held in the predetermined shape of said perimeter when said clamps are actuated.

2. A fixturing system as defined in claim 1 wherein the plurality of members also form a second picture frame shape defining a second opening located orthogonally to the first opening, and including:

a second fixture including a second plate for resting within the second opening defined in the furniture, the second plate including a second perimeter of predetermined shape with four orthogonal edges and four corners; and further including a plurality of second clamps secured to said second plate proximate said four orthogonal edges, at least one of said second clamps being located along each of said four orthogonal edges, said second clamps each including a clamping foot and being actuatable so that said clamping foot engages one of said plurality of members to securely retain the one member against a corresponding orthogonal edge of said second plate during attachment of the plurality of members together, whereby said plurality of members are held in the predetermined shape of said first and second fixture perimeters when all of said clamps are actuated.

3. A fixturing system as defined in claim 2 wherein said first fixture includes a pair of said first clamps located along each of said three orthogonal edges, and said second fixture includes a pair of said second clamps located along each of said four orthogonal edges.

4. A fixturing system as defined in claim 3 wherein said first clamps are movable between an actuated position whereat said first clamping feet create a holding force along a plane defined by the first plate, the holding force acting in a direction that is toward the first plate and perpendicular to the perimeter of the first plate at the point of intersection of the holding force and the perimeter.

5. A fixturing system as defined in claim 4 including at least one manually lockable hand clamp for use in the first opening with the first fixture, said hand clamp being used along the side of the first opening where the first fixture lacks clamps, said hand clamp including opposing jaws with orthogonal surfaces configured to engage and bias a pair of the plurality of members of the furniture to a flush position against each other to thus accurately form the first opening.

6. A fixturing system as defined in claim 1 including at least one manually lockable hand clamp for use in the opening with the fixture, said hand clamp being used along a side of the first opening where the first fixture lacks clamps, said hand clamp including opposing jaws useful for biasing a pair of the plurality of members of the furniture to a flush position with respect to each other.

7. A fixturing system as defined in claim 1 wherein said clamps are movable between a release position and an actuated position whereat said clamping feet create a holding force directed in a plane defined by the plate, the holding force acting in a direction that is toward the plate and perpendicular to the perimeter at a point of intersection defined by the holding force and the perimeter.

8. A fixturing system for furniture for accurately forming an opening in the furniture having a predetermined size and shape, the furniture including orthogonally related members configured to be mateably assembled together, the orthogonally related members including inside marginal surfaces defining the predetermined size and shape of the opening, comprising:

a plate having three orthogonally related edges configured to engage the inside marginal surfaces of said orthogonally related members; and a plurality of clamps including at least one clamp attached to said plate along each of said three orthogonally related edges, said plurality of clamps being configured to securely retain said orthogonally related members against said orthogonally related edges so that said opening is positively set and controlled by the engagement of said inside marginal surfaces with said orthogonally related edges.

9. A fixturing system as defined in claim 8 wherein said plate includes a fourth orthogonally related edge configured to engage a corresponding inside marginal surface on said orthogonally related members.

10. A fixturing system as defined in claim 8 wherein said plate includes a fourth orthogonally related edge, and including separate clamps not attached to said plate that are configured to engage said orthogonally related members of said furniture proximate but spaced from said fourth orthogonally related edge.

11. A fixturing system as defined in claim 8 wherein said plate includes a pair of said clamps located on each of said three orthogonally related edges.

12. A fixturing system as defined in claim 8 including a second plate having three additional orthogonally related edges configured to engage additional inside marginal surfaces of said orthogonally related members to form a second opening in the furniture; and a plurality of second clamps including at least one second clamp attached to said second plate along each of said three additional orthogonally related edges, said plurality of second clamps being configured to securely retain said additional orthogonally related members against said additional orthogonally related edges so that said second opening is positively set and controlled by the engagement of said additional inside marginal surfaces with said additional orthogonally related edges.

13. A fixturing system as defined in claim 12 wherein said first and second plates are configured to engage different sides of a common one of the orthogonally related members, and said first and second clamps are positioned to engage the common one orthogonally related member without interferingly engaging each other.

14. A fixturing system as defined in claim 8 wherein said three orthogonally related edges include three elongated linear surfaces forming two corners, said three elongated linear surfaces defining and accurately determining the width and squareness of three corresponding sides of the opening.

* * * * *